(12) United States Patent
Dufourg

(10) Patent No.: US 6,254,041 B1
(45) Date of Patent: Jul. 3, 2001

(54) CABLE CONDUIT

(75) Inventor: Bernard Dufourg, Paris (FR)

(73) Assignee: Societe de Constructions Eleciriques de la Seine (CES) (FR)

( * ) Notice: Subject to any disclaimer, the term of this patent is extended or adjusted under 35 U.S.C. 154(b) by 0 days.

(21) Appl. No.: 09/399,387

(22) Filed: Sep. 20, 1999

(51) Int. Cl.[7] .................. H02G 3/04; F16L 3/08
(52) U.S. Cl. .............. 248/65; 174/19; 174/65 R; 174/49; 211/26.2
(58) Field of Search ............ 248/65, 67.5, 67.7, 248/69, 71–72, 68.1, 74.1, 74.3, 56; 211/26, 26.2; 174/1, 19, 48–49, 65 R, 68.1, 70 R, 100–101

(56) References Cited

U.S. PATENT DOCUMENTS

| | | |
|---|---|---|
| 1,939,086 * 12/1933 | Shafer, Jr. | |
| 1,981,240 * 11/1934 | McNeil. | |
| 2,053,262 * 9/1936 | Cornell, Jr. | 248/65 |
| 2,873,082 * 2/1959 | Gillespie. | |
| 3,118,017 * 1/1964 | Wimbish | 174/100 |
| 3,329,763 * 7/1967 | D'Esopo | 174/70 R |
| 3,968,322 * 7/1976 | Taylor | 174/101 |
| 4,043,527 * 8/1977 | Franzmeier | 248/65 |
| 4,102,524 * 7/1978 | Cseri | 248/56 |
| 4,219,174 * 8/1980 | Whitehouse | 248/71 |
| 4,385,504 * 5/1983 | Perrone et al. | 248/56 |
| 4,723,749 * 2/1988 | Carraro et al. | 248/72 |
| 5,267,710 * 12/1993 | Condon | 248/65 |
| 5,752,682 * 5/1998 | Anderson | 248/68.1 |
| 5,971,329 * 10/1999 | Hickey | 248/68.1 |

FOREIGN PATENT DOCUMENTS 0 813 012 A1   12/1997   (EP).
1 375 765      4/1963    (FR).

* cited by examiner

Primary Examiner—Daniel P. Stodola
Assistant Examiner—Jennifer E. Novosad
(74) Attorney, Agent, or Firm—Piper Marbury Rudnick & Wolfe

(57) ABSTRACT

Cable conduit comprising a section of U-shape cross-section, with a base and two wings, the base having U-shape cut-outs each bounding a tongue. One of the tongues is folded back on the base so as to leave free a cable passage opening which enables a cable supported in the cable conduit, to run out from the cable conduit.

16 Claims, 1 Drawing Sheet

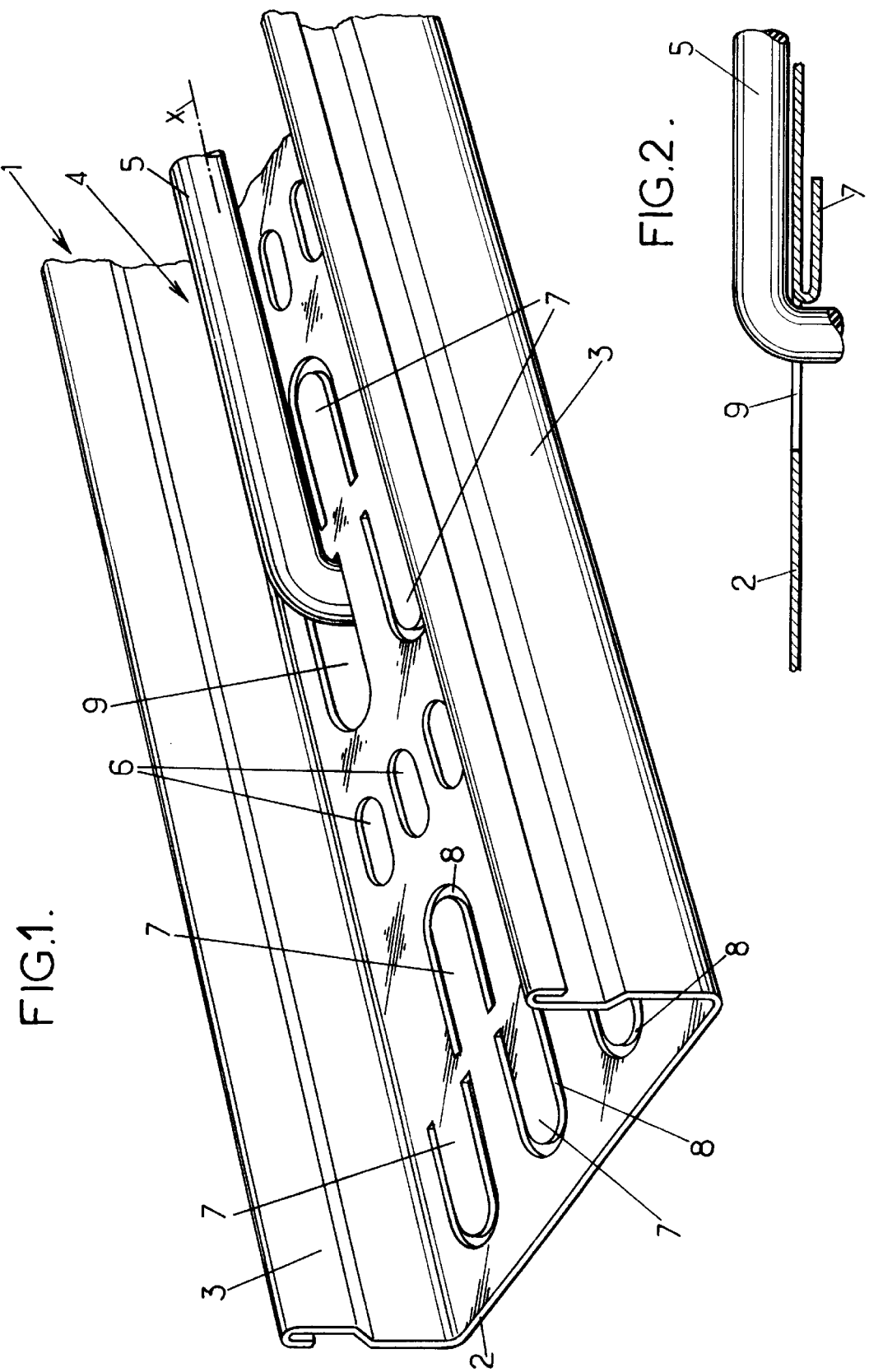

CABLE CONDUIT

FIELD OF THE INVENTION

The present invention relates to cable conduits.

The invention relates more specifically to cable conduits comprising a section with at least one wall in which U-shaped cut-out sections are provided, each delimiting a tongue.

BACKGROUND OF THE INVENTION

Document EP-A-0 813 012 describes an example of this type of cable conduit, in which the tongues are used for attaching cable fixing collars.

The known cable conduit of this type has a disadvantage in that it requires special accessories at points where the cables are run out from the cable conduit, which increases the cost and complexity of using this cable conduit.

OBJECTS AND SUMMARY OF THE INVENTION

The specific purpose of this invention is to overcome this drawback.

To this end, the invention proposes a cable conduit of the type in question which is essentially characterised in that at least one of said tongues is folded back on itself so as to leave free a cut-out portion through which cable can be passed through the wall of the cable conduit.

As a result of this arrangement, there is no need for any special costly or complex fixtures for running cables into and out from the cable conduit. Furthermore, the tongue can be folded back on itself to free up a cut-out passage for the cable in a simple and rapid operation on the part of the cable fitter. Finally, if the U-shaped cut-out portions are spaced at quite short intervals along the cable conduit, the invention provides an option of selecting precisely the best point for forming a cable passage.

In preferred embodiments of the invention, one and/or another of the following arrangements may optionally be provided:

- the profile may be U-shaped in cross-section having a base and two wings;
- the U-shaped cut-out portions are arranged at least in the base of the section;
- the U-shaped cut-out portions are arranged at regular intervals along the run of cable conduit;
- the tongue which is folded back on itself to free up a cable passage opening is folded out towards the exterior of the cable conduit;
- the tongue which is folded back on itself to free up a cable passage opening is folded out at substantially 180 degrees;
- the cable conduit supports at least one cable which is passed through the cable passage opening;
- the cable passage opening is of a width at least equal to 1 cm and a length at least equal to 2 cm;
- the section is made from metal.

BRIEF DESCRIPTION OF THE DRAWINGS

Other features and advantages of the invention will become clear from the following description of an embodiment, given by way of illustration and not restrictive in any respect, with reference to the appended drawings.

Of the drawings:

FIG. 1 is a perspective view of one embodiment of a cable conduit as proposed by the invention, and FIG. 2 is a detail in cross-section of the cable conduit of FIG. 1.

MORE DETAILED DESCRIPTION

The same references are used to denote the same or similar elements in the drawings.

FIG. 1 illustrates a cable conduit 1 which is a metal section of a U-shaped cross-section having a base 2 and two side wings 3 which, depending on the circumstances, may be closed off by a cover (not illustrated). The section 1 bounds an internal space 4 designed to receive one or more cables 5, each extending in the longitudinal direction X of the cable conduit.

The cable 5 is secured inside the cable conduit 1, generally by means of flexible clamping collars (not illustrated), which are located in longitudinal orifices 6 and/or on the tongues 7 bounded by the U-shaped slits provided at least in the base 2 of the cable conduit, as explained in document EP-A-0 813 012 mentioned above.

The tongues 7 preferably extend in the direction X and the U-shaped slits bordering these tongues are preferably arranged at regular intervals spaced close together along the run of cable conduit (the distance between two successive tongues 7, measured parallel with the direction X, will be at most 3 cm, for example).

For the purposes of the invention, at least one of the tongues 7 is used to provide a cable passage opening 9 in the base 2 of the cable conduit by folding said tongue back on itself. By preference, the tongue 7 is folded out towards the exterior of the cable conduit, advantageously at substantially 180 degrees, as illustrated in FIG. 2.

Consequently, the cable 5 may be run out from the interior space 4 of the cable conduit and connected to an electrical installation or another cable conduit by passing it through the cable passage opening 9.

Optionally, the cable 5 may be attached to the cable conduit 1 by nothing more than the oblong orifices 6 or by any other means so that the tongues 7 and the U-shaped slits 8 may be of any shape, provided the opening 9 is of a sufficient size to allow at least one cable 5 to be passed through it.

In particular, the width of the slits 8 may be less than 2 mm or even 1 mm, as required, but will generally be between 2 and 5 mm.

The openings 9 may optionally have a relatively large width, measured perpendicular to the direction X, for example in excess of 2 cm, it being possible in particular for this width to be between 5 mm and 5 cm and advantageously between 1 and 3 cm.

Furthermore, the length of the openings 9, measured parallel with the longitudinal direction X, may between 2 and 5 centimeters, or even more.

I claim:

1. A cable conduit, comprising: a section which extends in a longitudinal direction and which is adapted to support at least one cable arranged along said longitudinal direction, said cable conduit having at least one wall which extends parallel to said longitudinal direction, in which U-shaped cut-out portions are provided, each bounding a tongue, at least one of said tongues being folded back by approximately 180 degrees, thereby forming a cable passage opening in said at least one wall, wherein the at least one cable is capable of running freely through said cable passage opening without being retained in said cable passage opening by said tongue.

2. A cable conduit combination as claimed in claim 1, in which the section has a U-shaped cross-section with a base and two wings.

3. A cable conduit combination as claimed in claim 2, in which the U-shaped cut-out portions are provided at least in the base of the section.

4. A cable conduit combination as claimed in claim 1, in which the U-shaped cut-out portions are arranged repeatedly along said cable conduit.

5. A cable conduit combination as claimed in claim 1, in which the cable passage opening is of a width at least equal to 1 cm and a length at least equal to 2 cm.

6. A cable conduit combination as claimed in claim 1, in which the section is made from metal.

7. A cable conduit according to claim 1, wherein said at least one wall has a supporting face on which said at least one cable is adapted to extend in said longitudinal direction, said folded back tongue being folded opposite to said supporting face.

8. A combination cable and cable conduit, comprising: at least one cable; and a cable conduit, the cable conduit having a section which extends in a longitudinal direction and which supports the at least one cable arranged along said longitudinal direction, said cable conduit having at least one wall which extends parallel to said longitudinal direction, in which U-shaped cut-out portions are provided, each bounding a tongue, at least one of said tongues being folded back, thereby forming a cable passage opening in said at least one wall, and the cable running freely through said cable passage opening without being retained in said cable passage opening by said tongue.

9. A combination cable and cable conduit according to claim 8, wherein said at least one wall has a supporting face on which said at least one cable extends in said longitudinal direction, said folded back tongue being folded opposite to said supporting face.

10. A combination cable and cable conduit as claimed in claim 9, in which the folded back tongue is essentially folded back by 180 degrees.

11. A combination cable and cable conduit as claimed in claim 8, in which the section has a U-shaped cross-section with a base and two wings.

12. A combination cable and cable conduit as claimed in claim 11, in which the U-shaped cut-out portions are provided at least in the base of the section.

13. A combination cable and cable conduit as claimed in claim 8, in which the U-shaped cut-out portions am arranged repeatedly along said cable conduit.

14. A combination cable and cable conduit as claimed in claim 8, in which the folded back tongue is essentially folded back by 180 degrees so that said tongue does not obstruct entry into the cable passage opening.

15. A combination cable and cable conduit as claimed in claim 8, in which the cable passage opening is of a width at least equal to 1 cm and a length at least equal to 2 cm.

16. A combination cable and cable conduit as claimed in claim 8, in which the section is made from metal.

* * * * *